United States Patent
Kapustin et al.

(10) Patent No.: US 8,011,052 B2
(45) Date of Patent: Sep. 6, 2011

(54) DEVICE FOR CLEANING MULTIDIAMETER PIPELINES

(75) Inventors: Eugene Kapustin, Thornhill (CA); Sergei Filippovitch, Richmond Hill (CA)

(73) Assignee: PII (Canada) Limited, Calgary (CA)

( * ) Notice: Subject to any disclaimer, the term of this patent is extended or adjusted under 35 U.S.C. 154(b) by 1114 days.

(21) Appl. No.: 11/613,000

(22) Filed: Dec. 19, 2006
(Under 37 CFR 1.47)

(65) Prior Publication Data
US 2008/0141474 A1    Jun. 19, 2008

(51) Int. Cl.
*B08B 9/055* (2006.01)

(52) U.S. Cl. ............. 15/104.061; 15/104.05; 15/104.16; 15/104.17

(58) Field of Classification Search ............... 15/104.05, 15/104.061, 104.068, 104.17, 104.18, 104.19, 15/104.16
See application file for complete search history.

(56) References Cited

U.S. PATENT DOCUMENTS

| | | |
|---|---|---|
| 576,425 A | 2/1897 | Bilton et al. |
| 971,042 A | 9/1910 | Hill, Jr. et al. |
| 2,622,255 A | 12/1952 | Ver Nooy |
| 2,957,189 A | 10/1960 | Nelson et al. |
| 3,292,197 A | 12/1966 | Stephens |
| 3,576,043 A | 4/1971 | Zongker |
| 3,604,041 A | 9/1971 | Ver Nooy |
| 4,506,401 A | 3/1985 | Knapp |
| 4,538,316 A | 9/1985 | Reinhart et al. |
| 5,461,746 A | 10/1995 | Banik et al. |
| 5,699,577 A | 12/1997 | Rankin |
| 5,903,946 A | 5/1999 | Collins et al. |
| 6,098,231 A * | 8/2000 | Smith et al. .............. 15/104.061 |
| 6,381,797 B1 | 5/2002 | Filippovitch et al. |
| 6,538,431 B2 * | 3/2003 | Couchman et al. ........... 324/220 |
| 6,553,602 B1 | 4/2003 | Skarupa et al. |

* cited by examiner

*Primary Examiner* — Randall Chin
(74) *Attorney, Agent, or Firm* — Potomac Patent Group PLLC

(57) ABSTRACT

A trailing pig cleaning device is adapted to be dragged by a pig towing device. The cleaning device collects a predetermined quantity of debris. The cleaning device has a continuous outer surface portion of variable diameter urged into normal contact with the internal wall of the pipeline. The continuous outer surface portion presents a continuous upstream or leading edge portion for scraping debris from the cylindrical internal wall in advance of the outer surface portion. The device has a debris collecting surface portion extending radially inward from the outer surface portion for collecting the predetermined quantity of debris scraped from the cylindrical internal wall. The device has at least one debris and pipeline media bypass opening passing through the debris collecting surface portion permitting excess scraped debris to pass therethrough back into the pipeline and permitting media to pass thereby to propel the pig towing device.

17 Claims, 7 Drawing Sheets

DEVICE FOR CLEANING MULTIDIAMETER PIPELINES

FIELD OF THE INVENTION

The present invention relates to a pipeline cleaning device and in particular a cleaning device that is dragged behind a tow section of a pig and collects a predetermined amount of debris.

BACKGROUND OF THE INVENTION

Prior to inspecting the integrity of a pipeline with a pig it is usually necessary to first clean the pipeline to remove debris from the pipeline that would otherwise interfere with the inspection instrumentation of the pig. In some instances the pipeline may not have been cleaned for 10, 15 or 20 years, however, in view of recent regulations older pipelines are now being required to be cleaned and inspected. The debris typically comprises dust, grease and sludge built up over years of use of the pipeline. In instances where the pipeline has never been cleaned for inspection, it is common to find devices, scrap metal and other waste left in the pipeline by laborers who built the pipeline.

In practice, the cleaning device, or cleaning pig, scrapes the inside wall of the pipeline. The cleaning device typically carries metal brushes for scraping the pipeline and magnets for collecting metal debris. The cleaning device has a propulsion unit that seals with the internal wall of the pipeline and pushes all other scraped debris in front of the cleaning device as the device moves through the pipeline. In pipelines designed for a cleaning device, the cleaning device pushes the debris to an entry/exit hatch in the pipeline where the debris is removed by shovel.

This cleaning device, which pushes the debris in front of it, typically comprises either a foam pig that seals against the pipeline inner wall, or a dome shaped disk of predetermined diameter that seals against the pipeline inner wall. The foam pig and disk like device is propelled by media in the pipeline acting against an upstream face of these cleaning devices. For a pipeline having multiple diameters along its length, the dome shaped disk cleaning device is modified with a series of butterfly rubber flaps attached about the periphery of the disk. These flaps are resilient and are sprung outwardly to contact the interior wall of the pipeline when the diameter of the pipeline becomes larger than the predetermined diameter of the dome shaped disk. These flaps, like the dome shaped disk outer periphery, make contact with the internal wall of the pipeline at an acute angle. This angle of contact does not provide an effective scraping edge surface to effectively remove debris from the internal wall of the pipeline.

To accommodate for the cleaning of pipelines not designed with exit/entry hatches for a cleaning device, it is necessary to create "hot taps" in the pipeline spaced apart by distances of many miles. The hot taps usually each comprise a Y connection with the pipeline that allows for the cleaning device to be inserted in the pipeline at a tight angle of about 45 degrees. Launching the cleaning device is not a problem. The problem for the cleaning device comes when the device is to be removed from a downstream Y connection hot tap. The device must once again negotiate a tight angle of 45 degrees to exit the hot tap. However, there is no way of knowing how much debris is being pushed by the cleaning device and should this debris clog the pipeline at the hot tap exit, the cleaning device may become stuck in the pipeline.

Accordingly, there is a need for a cleaning device for use in a pipeline that is not prone to problems associated with a cleaning device that pushes the debris out in front of the cleaning device as the device moves along the pipeline, or to pipelines containing unmanageable amounts of debris.

BRIEF DESCRIPTION OF THE INVENTION

The present invention relates to a trailing pig cleaning device adapted to be dragged behind a pig towing device. In this manner the cleaning device is pulled out by the tow section and is not pushed by the tow section. The trailing pig cleaning device is adapted to collect a predetermined quantity of debris from a pipeline having a cylindrical internal wall. The trailing pig cleaning device comprises a continuous outer surface portion of variable diameter urged into normal contact with the cylindrical internal wall. The continuous outer surface portion presents a continuous upstream or leading edge portion for scraping debris from the cylindrical internal wall in advance of the outer surface portion. The device comprises a debris collecting surface portion extending radially inward relative to the outer surface portion for collecting the predetermined quantity of debris scraped from the cylindrical internal wall. The device further comprises at least one debris and pipeline media bypass opening passing through the debris collecting surface portion permitting scraped debris in excess of the predetermined quantity of debris to pass therethrough and back into the pipeline. The at least one bypass opening also permits pipeline media to pass therethrough to propel the pig towing device.

The pig cleaning device does not push the debris in front of the towing pig and only collects a predetermined amount of debris dictated by the size and shape of the debris collecting surface portion. Consequently, significant build up of debris in the pipeline is less likely to encumber the operation of the pig cleaning device. It should be understood that in order to effectively clean the pipeline, multiple passes of the pig cleaning device of the present invention may be required.

In one embodiment the at least one debris and pipeline media bypass opening is centrally located relative to the debris collecting surface portion. Alternatively, it is envisaged that one or more openings may pass through various portions of the debris collecting surface.

In one embodiment the debris collecting surface portion is continuous and extends radially inwardly of the continuous outer surface portion adjacent the continuous leading edge portion. In an alternative embodiment, the debris collecting surface portion may be located upstream of the leading edge portion in the pipeline.

In one embodiment, the trailing pig cleaning device may comprise at least one crown comprising a support member comprising the continuous outer surface portion, the continuous leading edge portion, and the debris collecting surface portion. The debris collecting surface portion is continuous and extends radially inwardly of the continuous outer surface portion adjacent the continuous leading edge portion.

The debris collecting surface portion in another embodiment may comprise a collection vessel having a collapsible bowl shape with a central frustum. The central frustum defines the one debris and pipeline media bypass opening which is also located downstream in the direction of the pipeline media flow relative to recessed portions of the second debris collecting surface portion. The debris and pipeline media bypass opening of the central frustum permits scraped debris not collected by the debris collecting surface portion to pass from the trailing pig cleaning device.

In another embodiment, the trailing pig cleaning device may comprise an expandable helical bar comprising the continuous outer surface portion, the continuous leading edge portion, and the debris collecting surface portion.

The expandable helical bar may have a forward end and a rearward end. The trailing pig cleaning device may further comprise a spring loaded shaft having a first end connected with the forward end of the helical bar and a second end connected with the rearward end of the helical bar. The first end of the shaft is rotatable relative to the second end of the shaft to vary the length of the shaft and vary the pitch and outside diameter of the bar so as to maintain a portion of the outer surface portion of the bar in normal contact with the cylindrical internal wall.

BRIEF DESCRIPTION OF THE DRAWINGS

For a better understanding of the nature of the present invention reference may be had by way of example to the accompanying diagrammatic drawings.

DETAILED DESCRIPTION OF THE INVENTION

The present invention relates to a pipeline cleaning device and in particular a cleaning device that is dragged behind a tow section of a pig and collects a predetermined amount of debris. It should be understood that media such as for example, gas or oil, flows through the pipeline from an upstream position to a downstream position. Hence the terms upstream and downstream used throughout the specification are in respect of the direction of flow of media in the pipeline.

Figure 1:
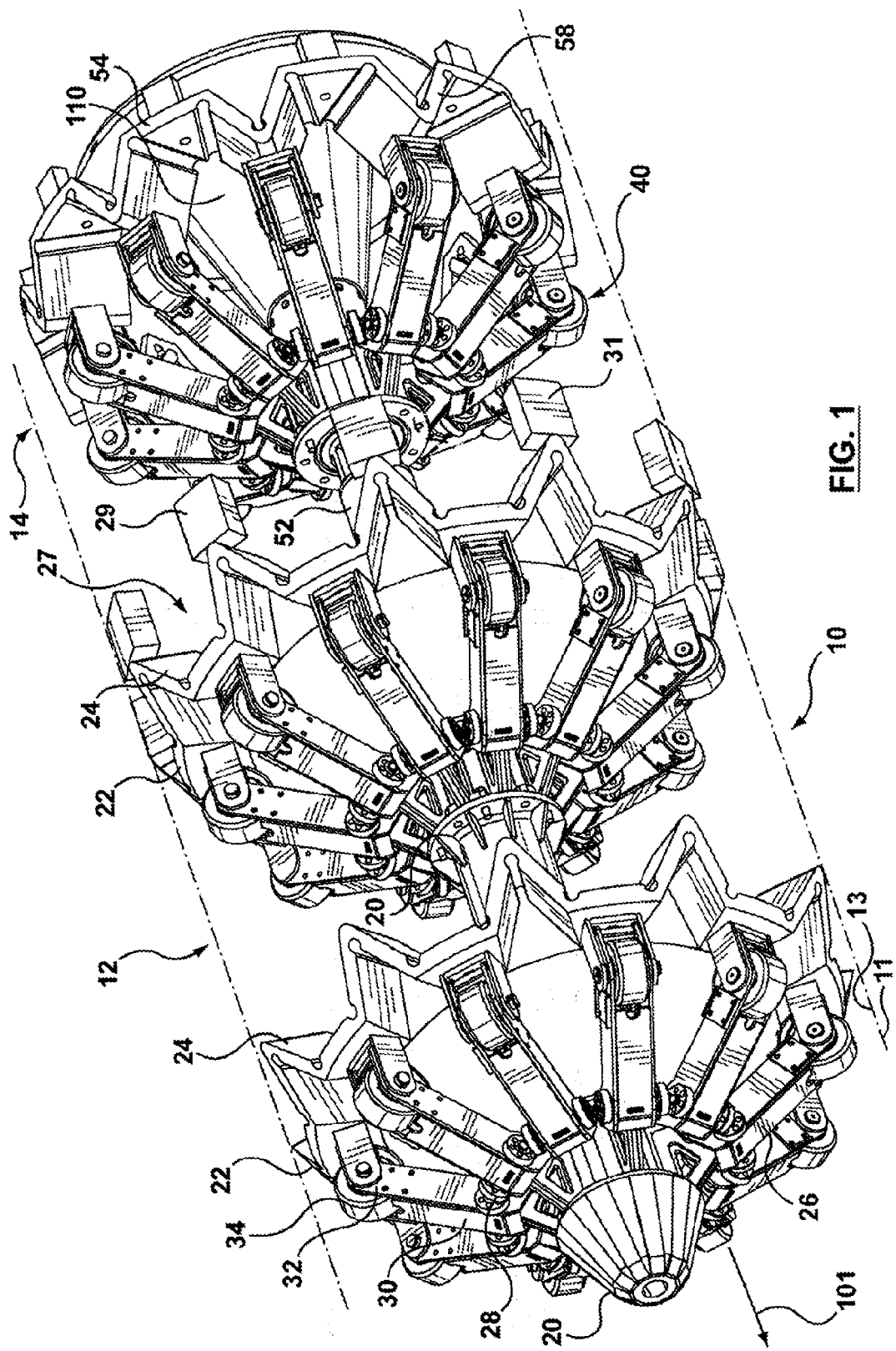
FIG. 1 is a perspective view of a towing section and cleaning device for a pipeline pig.

Referring to FIG. 1 there is shown a multi-diameter pig 10 used for cleaning a pipeline 11. In this Figure the pig 10 comprises a towing section 12 followed by a trailing pig cleaning section 14. The tow section 12 comprises two spaced apart cups or disk shape members 22. The disk shape members 22 have a support member 24 which comprises a polyurethane material of a specified hardness. The hardness of the polyurethane material of support members 24 is chosen to allow this material to expand and contract with multiple diameters and bend and pass over any debris found within the pipeline. The expansion of the support members 24 is controlled by the plurality of linkage arms 26 which are spaced circumferentially about the nose or hub 20 and extend from the nose 20 via a pivotal engagement 28 located at a first end 30 of the linkage arms 26 to a second end 32 of the linkage arms 26 and which are pivotally attached to the support member 24. The second pivotal end attachment 32 of the linkage arms 26 also carries roller wheels 34 which are adapted to roll against the interior wall of the pipeline (although not shown to do so in the illustration of FIG. 1). The linkage arms 26 may contain some form of spring mechanism in them that urges the arms 26 into an outward radial displacement so as to expand naturally the support members 24 to accommodate different diameters of the pipeline. The purpose of the tow section 12 is to have the support members 24 seal with the internal wall 13 of the pipeline 11 and to drag the cleaning section 14 through the pipeline 11 as media flows in the direction of arrow 101 through the pipeline 11 and impinges on the upstream side 27 of the disk shape members 22 to propel the tow section 12 through the pipeline 11. In FIG. 1, the downstream disk member 22 has a plurality of metal brushes 29 attached to and extending from the support member 24. These brushes 29 act to scrape debris from the internal wall 13 of the pipeline 11. The ends of the brushes 29 carry magnets 31 that urge the brushes 29 into engagement with the internal wall 13 of pipeline 11 and also act to collect some metallic debris. For a better understanding of the towing section or device 12 reference may be had to U.S. Pat. No. 6,381,797 B1 issued May 1, 2002. It should be understood that other embodiments for the towing section or device may be used to drag the pig cleaning device of the present invention through the pipeline and that the pig towing device should not be limited to that shown in FIG. 1.

Figure 2:
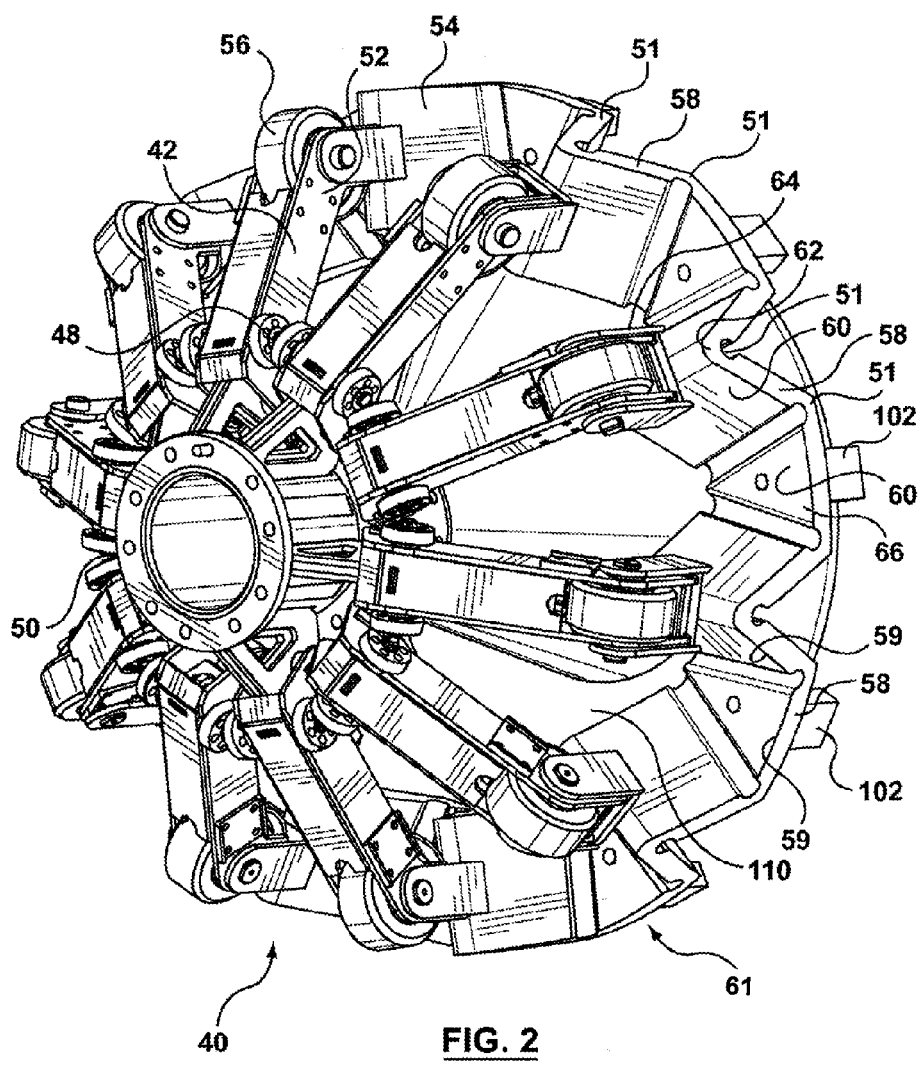
FIG. 2 is a perspective view of the cleaning section of the pig of FIG. 1.
Figure 3:
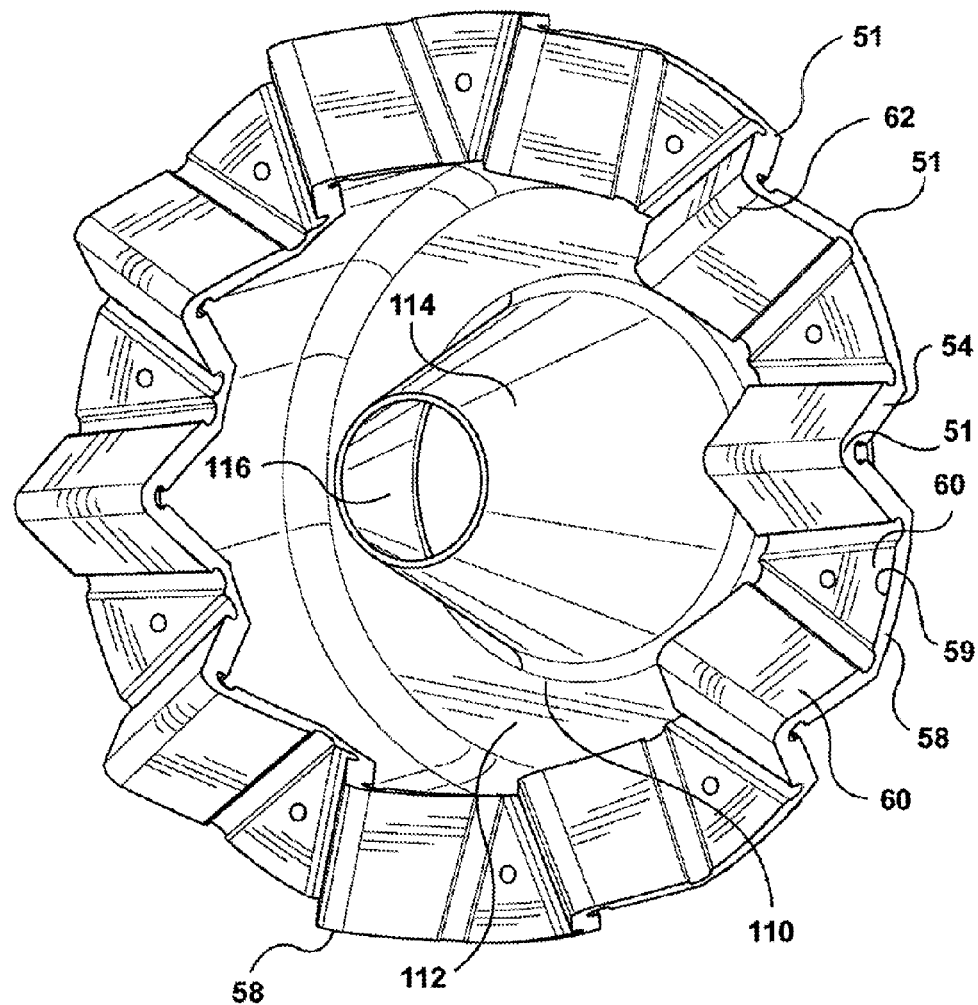
FIG. 3 is a second perspective view of the collection vessel of the cleaning device of FIG. 2.
Figure 4:
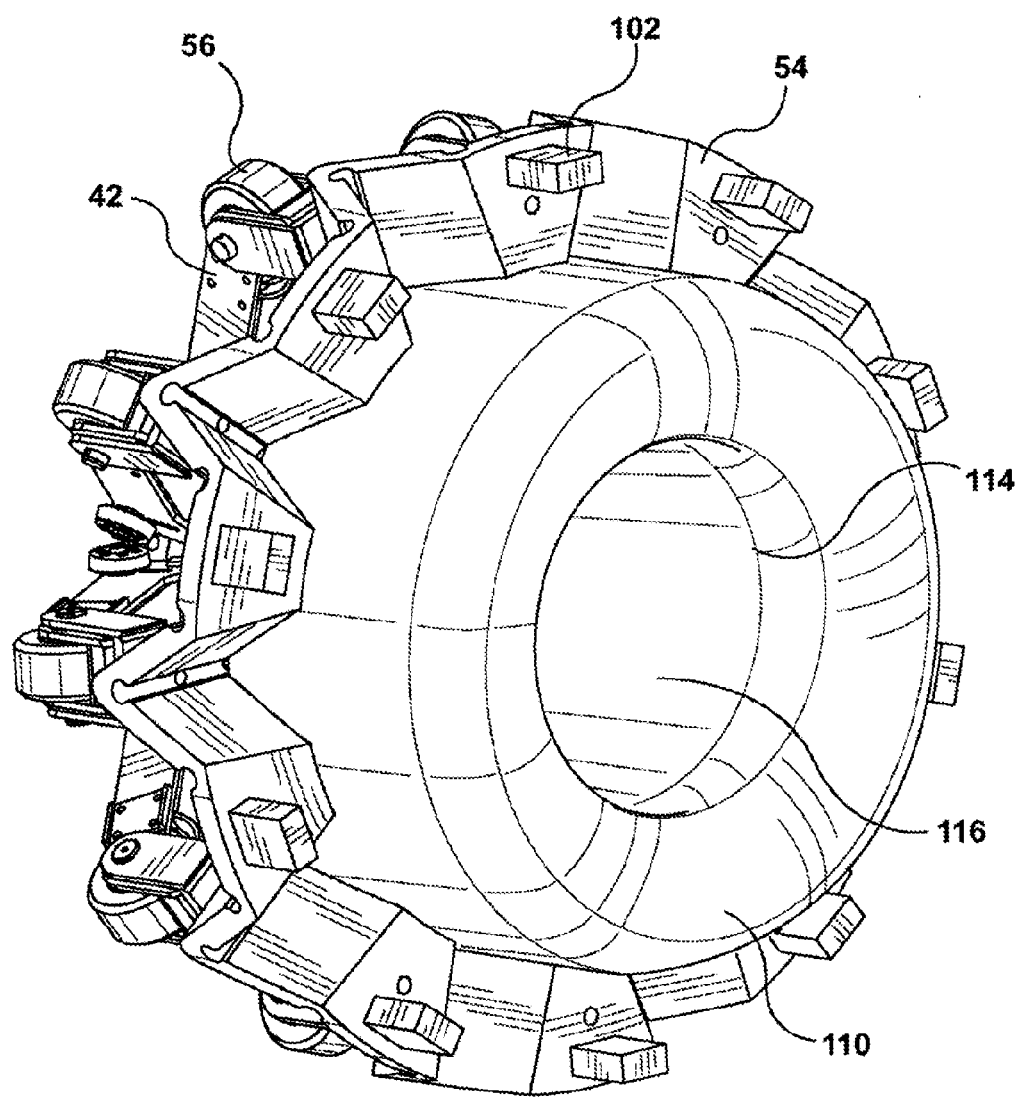
FIG. 4 is a rear perspective view of the cleaning device of FIG. 1.

Referring to FIGS. 1 and 2, the trailing pig cleaning device 14 comprises a crown section 40 comprising a plurality of linkage arms 42 which are connected through pivot points or pivot linkage 48 to the central hub 50 of the crown 40. The central hub 50 is attached by a shaft 52 (FIG. 1) to the tow section 12. The other end 52 of the link arms 42 are connected pivotally to a support member 54. The pivotal attachment at 52 also connects to wheels 56 which are adapted to engage the cylindrical internal wall 13 of the pipeline 11. The support member 54 comprises a polyurethane member which is of sufficient hardness that the support member 54 can expand or contract about hinge corner portions 61 to maintain a positive contacting engagement with the interior wall 13 of the pipeline 11. The support member 54 comprises a continuous outer surface portion 58 that is maintained in normal contact with the interior wall 13 of the pipeline 11. This provides a squeegeeing or scraping effect along a continuous leading edge portion 59 which results in debris being scraped forward of the outer surface portion 58. The scraped debris is then collected on a first continuous debris collecting surface portion 60 that extends radially inward from the outer surface portion 58 adjacent the leading edge portion 59. The debris collecting surface portion 60 comprises ridge portions 62 to which the linkage arms 42 are pivotally connected to a support bracket 64. The debris collecting surface portion 60, in this embodiment, also includes a recessed trapped surface area 66. This recessed trapped surface area 66 has an apex whose length will vary to allow the support member 54 to expand and contract radially maintaining the continuous outer surface portion 58 in normal scraping engagement of the interior wall of the pipeline. This expansion and contraction of the support member is permitted by hinging corners 51 in the support member 54. Behind support member 54 are radially spaced apart magnets 102 which act to urge the support member 54 radially outward.

Debris collected or scraped from the top portion of the pipeline 11 has a tendency to fall into the bottom portion of the pipeline 11. This scraped debris is collected by the first debris collecting surface portion 60 at a bottom portion of the support member 54. The debris as it builds up on the first debris collecting surface portion 60 tends to fall into a collection chamber or a collection vessel 110. The collection vessel 110 has a cupped shaped second debris collecting surface portion 112 that has a central frustum 114 with an opening 116 located downstream of the second debris collecting surface portion 112. In practice, the debris will only fill up the lower portion of this collection chamber as any extra debris will leave the collection chamber via the central opening 116.

It should be understood that the central opening 116 in the cleaning device 14 permits debris to bypass or pass through the cleaning device 14 and back into the pipeline 11. Since the cleaning device trails, or is dragged behind, the tow section 12 and permits for the escape of excess debris, the cleaning device 14 collects a predetermined quantity of debris in the pipeline. The trailing pig cleaning device 14 may be referred to as a trawling cleaning device. Further, it should be understood that several passes of the towing device 12 and the cleaning device 14 in the pipeline 11 may be required to adequately clean the pipeline 11. However, because of the nature of the trailing pig cleaning device 14 to collect a predetermined quantity of debris and because device 14 is pulled by a towing section 12, the debris is not pushed forward of the cleaning tool and excessive amounts of the debris are not collected thereby allowing for the towing section 12 and cleaning device 14 to be readily removed from the pipeline 11 at a downstream location. Also, the central opening 116 permits media in pipeline 11 to flow therethrough in the direction of arrow 101 to propel the tow section 12 along the pipeline.

Figure 5:
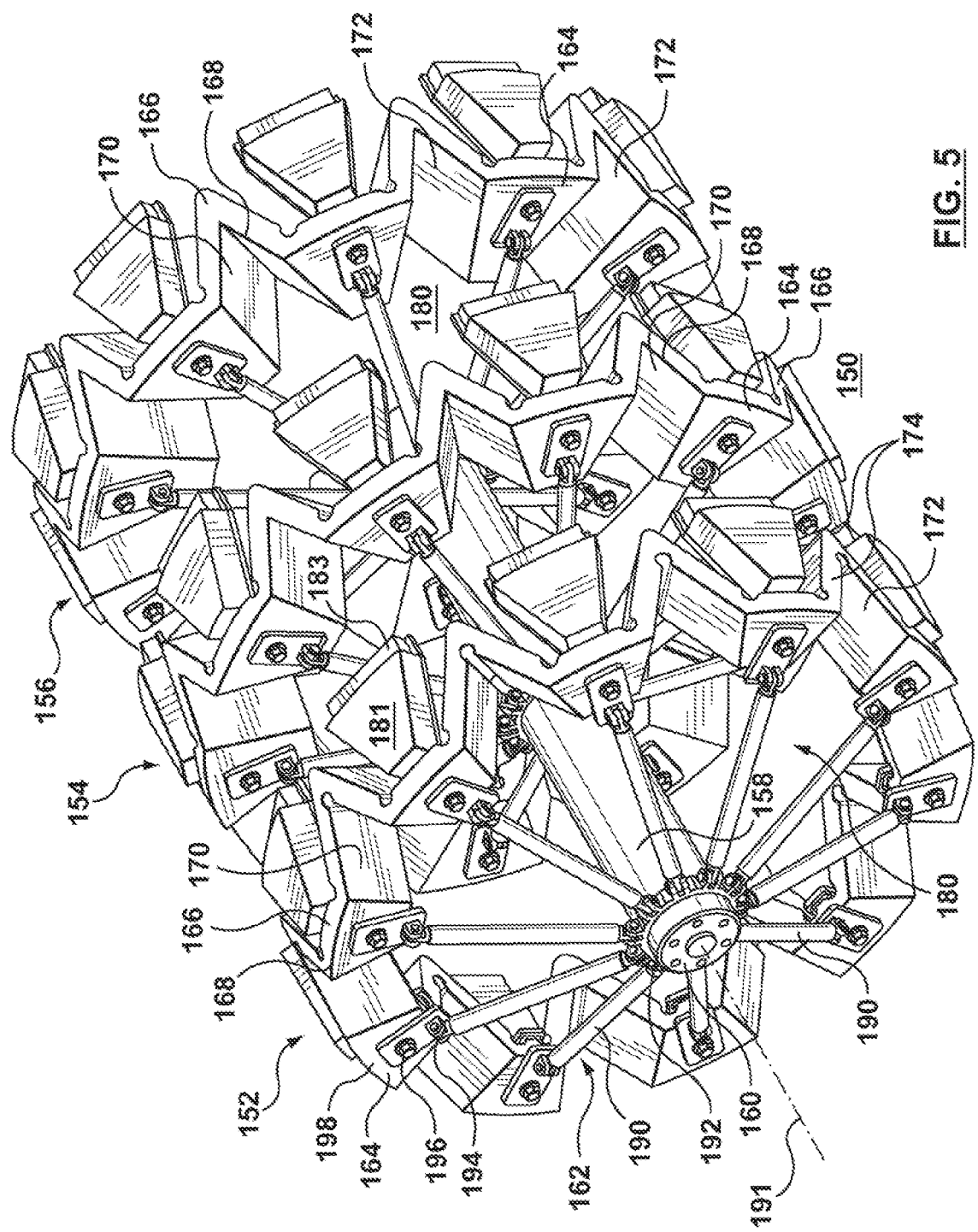
FIG. 5 is a view of a first alternative embodiment for the cleaning device.

Referring to FIG. 5 there is shown an alternative embodiment for the trailing pig cleaning device identified generally by numeral 150. In this embodiment, the pig cleaning device 150 comprises three sections 152, 154, and 156 interconnected by a shaft 158. The device has a leading central hub 160 adapted to be attached to the tow section 12 shown in FIG. 1 by shaft 52. Each of the sections 152, 154, and 156 are similar in construction. Each section 152, 154, 156 comprises a crown 162. The crown comprises a support member 164 comprising a continuous outer surface portion 166, a continuous leading edge portion 168, and a debris collecting surface portion 170. The debris collecting surface portion 170 is continuous and extends radially inwardly of the continuous outer surface portion 166 adjacent the continuous leading edge portion 168. The support member 164 is similar to the support member 54 of FIG. 1 and the corresponding portions 166, 168 and 170 function in the same manner described above for portions 58, 59 and 60, respectively.

The debris collecting surface portion 170 comprises a plurality of radially spaced apart recessed V shaped trap surface portions 172 for each section 152, 154, 156 adapted to trap portions of the debris. The trap surface portions 172 are adapted to vary in depth and width to adjust diameter of the continuous outer surface portion 170 by hinge corner portion 174. The recessed trap surface portions 172 have a V shape whose apex extends upstream in the pipeline. A debris and pipeline media bypass opening 180 is centrally located of the continuous debris collecting surface portion 170 of each support members 164.

To accommodate for changes in the diameter of the cylindrical internal wall 13 of the pipeline 11, each crown 162 comprises central hub 160 and a plurality of linking arms 190 circumferentially spaced about the hub and pivotally connected at a first end 192 to the hub 160. The link arms 190 are pivotally connected at a second end 194 with a bracket 196 mounted on a land portion 198 of the support member 164 at locations between the recessed trap surface portions 170. The link arms 190 are urged to pivot outwardly of the crown 162 to urge the continuous outer surface portion 164 into normal contact with cylindrical internal wall 11.

The crowns 162 of each section 152, 154, 156 are spaced apart from each other along an axis 191 of the pipeline 11. The debris collecting surface portions 170 of each crown 162 upstream in the pipeline from a downstream crown has a radial thickness that increases for each upstream positioned crown so as to have a greater area for collecting debris. Further each succeeding upstream section 154 and 156 is angularly offset so that the recessed trap surface portions 172 of successive sections pass over different portions of the internal wall 13 of the pipeline 11.

The support member 164 of each section 152, 154 and 156 supports a plurality of radially spaced apart trailing metal brushes 181 and corresponding magnets 183 downstream of the continuous leading edge portion 168. The magnets urge the continuous outer surface portion 164 into normal contact with the internal wall 11 and the brushes 181 into further scraping contact with the internal wall 13 of the pipeline 11. The magnets 183 also collect some metallic debris.

Figure 6:
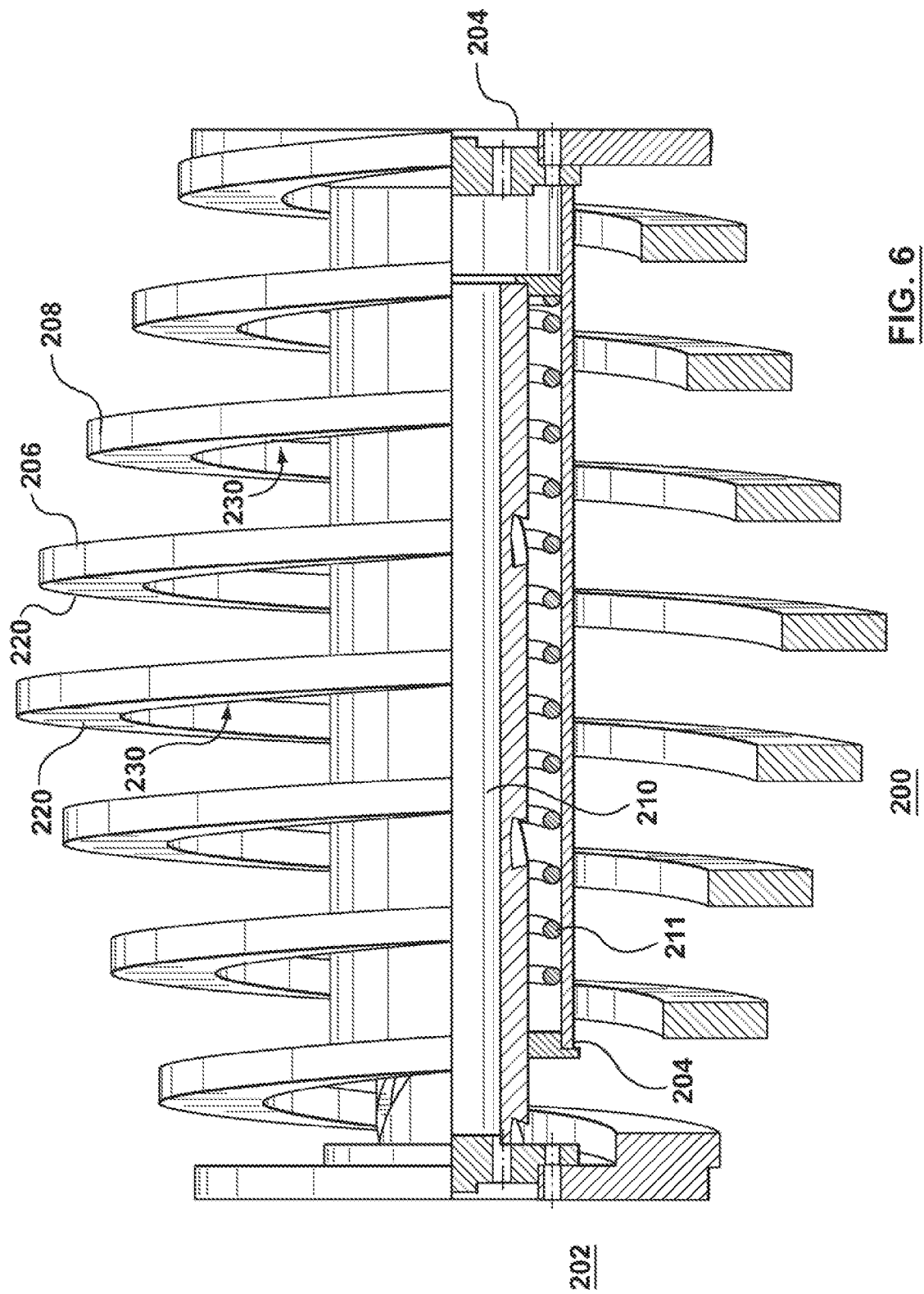
FIG. 6 is a side view showing partially in section a second alternative embodiment for the cleaning device of the present invention.
Figure 7:
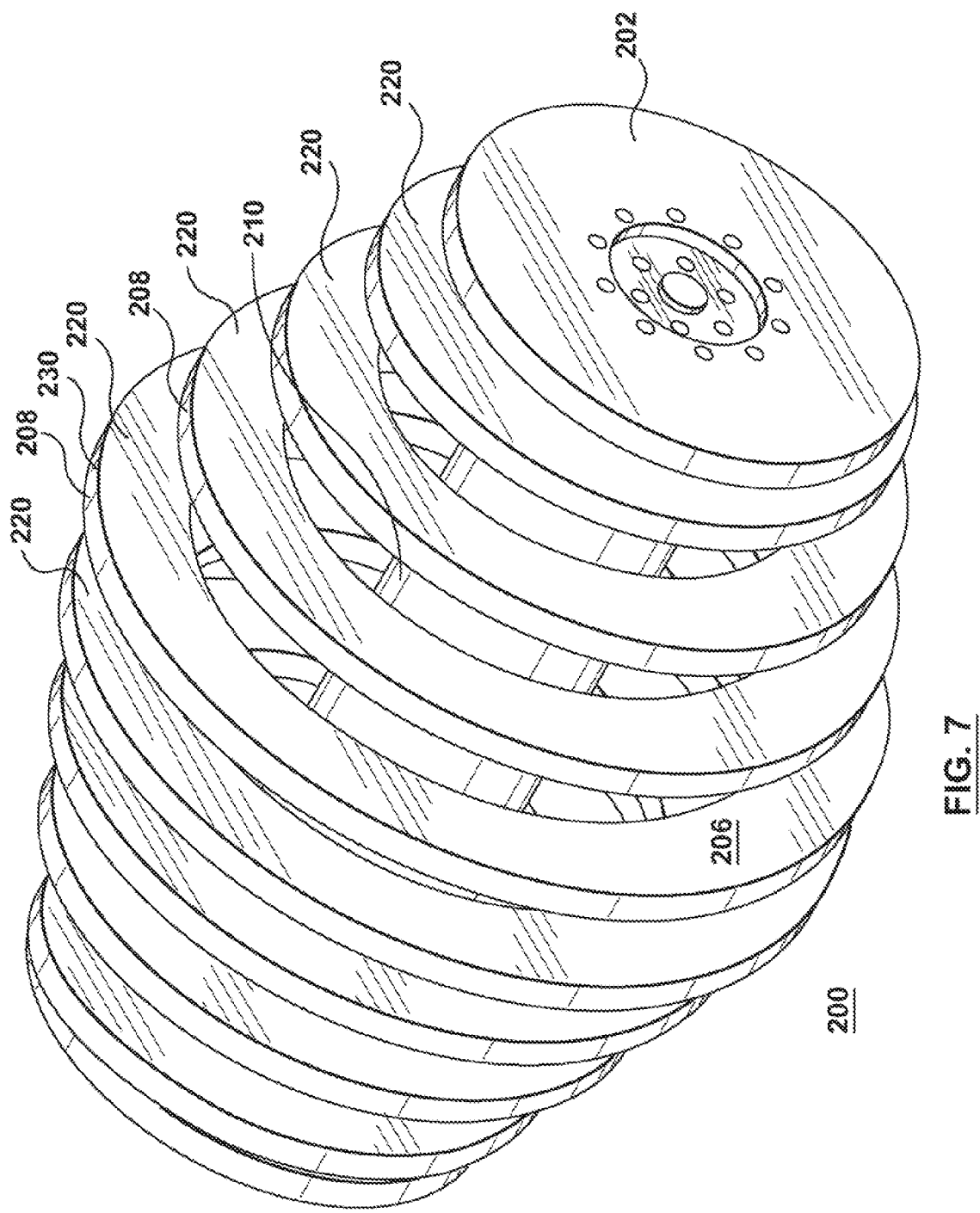
FIG. 7 is a perspective view of the cleaning device shown in FIG. 6.

Referring to FIG. 6 and 7, there is shown an alternative embodiment for the cleaning device of the present invention. The cleaning device 200 shown herein is adapted to be pulled from end 202. These ends or hubs 202 and 204 are attached by a continuous helical member or bar 206. The helical bar 206 is provided with a continuous outer surface portion 208 portions of which are adapted to make normal contact with the internal wall 13 of the pipeline 11. In FIGS. 6 and 7, the helical bar 206 is at its maximum diameter. At its maximum diameter the distance between end portions 202 and 204 are the shortest and at least one 360° ring of the helical bar 206 is adapted to have its outer surface portion 208 in normal engagement with the interior wall 13 of pipeline 11. In order to reduce the diameter of the helical portion 208, the end portions 202 and 204 are extended. This is accomplished by a central shaft 210 which has internal springs 211 interconnecting two telescopic sections. The telescopic sections are rotated relative to each other to adjust the axial length of the central shaft 210 and consequently adjust the diameter of the helical support bar 206. In this embodiment, the continuous outer surface portion 208 has portions thereof which are variable in diameter and are urged by the spring loaded shaft 210 into normal contact with the internal wall of the pipeline for scraping debris from the cylindrical internal wall. The cleaning device 200 has a debris collecting surface 220. The debris collecting surface 220 is a continuous surface and as excess debris collects on surface 220 it has a tendency to fall through the debris and pipeline media bypass opening 230 and falls or passes onto a succeeding ring of the helical member 206 and ultimately off an outer edge of the pig into the pipeline 11. It should be understood that for those rings where the diameter is less then the inside diameter of the pipeline, the debris will collect and pass on both sides of the ring. The at least one opening 230 is in the ring provides for a bypass and this opening is centrally located. The cleaning device 200 is adapted to be towed and the debris collecting surface portion 220 radially extends inwardly from the normal outer surface portion 208 to collect a predetermined quantity of debris. Debris is scraped from the interior wall 13 of pipeline 11 by continuous leading edge portion 230 for collection on debris collecting surface portion 220. Due to this and the fact that cleaning device 200 is adapted to be towed, the device and the tow section will not be trapped within the pipeline due to a collection of excessive amounts of debris.

While the invention has been described in terms of various specific embodiments, those skilled in the art will recognize that the invention can be practiced with modifications within the spirit and scope of the claims.

What is claimed is:

1. A trailing pig cleaning device adapted to be dragged behind a pig towing device, the trailing pig cleaning device collecting a predetermined quantity of debris from a pipeline having a cylindrical internal wall, the trailing pig cleaning device comprising:

a support member having a continuous outer surface portion of variable diameter urged into normal contact with the cylindrical internal wall, the continuous outer surface portion presenting a continuous leading edge portion for scraping debris from the cylindrical internal wall in advance of the outer surface portion;

a debris collecting surface portion connected to the support member and extending radially inward relative to the outer surface portion, the debris collecting surface portion being configured to collect the debris scraped from the cylindrical internal wall; and, a collection chamber configured to collect the debris from the debris collecting surface portion, and having a second debris collecting surface portion with at least one frustum extending contrary to a towing direction to a debris and pipeline media bypass opening through which the scraped debris in excess of the predetermined quantity leave the collection chamber and falls back into the pipeline, said at least one bypass opening also permitting pipeline media to pass in the towing direction to propel the pig towing device.

2. The trailing pig cleaning device of claim 1 wherein the at least one frustum is centrally located relative to the second debris collecting surface portion.

3. The trailing pig cleaning device of claim 1 wherein the debris collecting surface portion continuously extends radially inwardly from the continuous outer surface portion and is adjacent to the continuous leading edge portion.

4. The trailing pig cleaning device of claim 1, wherein the second debris collecting surface portion is cup-shaped.

5. The trailing pig cleaning device of claim 1 further comprising:

at least one crown connected to the support member and configured to be attached via a shaft to the pig towing device.

6. The trailing pig cleaning device of claim 5 wherein the crown comprises a downstream extending link arm attached to one of a downstream crown of another trailing pig cleaning device and a towing section for pulling the trailing pig cleaning device through the pipeline.

7. The trailing pig cleaning device of claim 5, wherein the support member supports trailing metal brushes and corresponding magnets located upstream in the pipeline of the continuous leading edge portion, the magnets urge the continuous outer surface portion into normal contact with the internal wall and urge the brushes into further scraping contact with the internal wall of the pipeline, and the magnets further collecting metallic debris.

8. The trailing pig cleaning device of claim 1 wherein the debris collecting surface portion comprises a plurality of radially spaced apart recessed trap surface portions adapted to trap portions of the debris, the trap surface portions being adapted to vary in depth and width to adjust diameter of the continuous outer surface portion.

9. The trailing pig cleaning device of claim 8 wherein the recessed trap surface portions have a V shape whose apex extends towards the pipeline.

10. The trailing pig cleaning device of claim 8 wherein the at least one frustum is centrally located of the second debris collecting surface portion.

11. The trailing pig cleaning device of claim 8 wherein the crown comprises a central hub and a plurality of linking arms circumferentially spaced about the hub and pivotally connected at a first end thereof to the hub, the linking arms being pivotally connected at a second end thereof to the support member at locations between the recessed trap surface portions, the linking arms being urged to pivot outwardly of the crown to place the continuous outer surface portion into normal contact with the cylindrical internal wall of the pipeline having varying diameter.

12. The trailing pig cleaning device of claim 1, further comprising a plurality of crowns spaced apart from one another along an axis of the pipeline, each crown being associated with a debris collecting surface portion, wherein a radial thickness of a corresponding debris collecting surface portion increasing for each crown.

13. The trailing pig cleaning device of claim 1, further comprising a plurality of crowns spaced apart from one another along an axis of the pipeline, wherein for each upstream crown, a recessed trap portion thereof is angularly displaced relative to a recessed trap portion of a downstream crown.

14. The trailing pig cleaning device of claim 1 wherein the second debris collecting surface portion is positioned radially inward from the first debris collecting surface portion for collecting scraped debris, the second debris collecting surface portion having a collapsible bowl shape.

15. The trailing pig cleaning device of claim 1 comprising an expandable helical bar comprising the continuous outer surface portion, the continuous leading edge portion, and the debris collecting surface portion.

16. The trailing pig cleaning device of claim 15 wherein the expandable helical bar has a forward end and a rearward end, and the trailing pig cleaning device further comprises a spring loaded shaft having a first end connected with the forward end of the helical bar and a second end connected with the rearward end of the helical bar, the first end of the shaft being rotatable relative to the second end of the shaft to vary length of the shaft and alter pitch and outside diameter of bar so as to maintain a portion of the outer surface portion of the bar in normal contact with the cylindrical internal wall.

17. The trailing pig cleaning device of claim 16 wherein the spring loaded shaft urges the outer surface portion of the bar into normal contact with the cylindrical internal wall.

* * * * *

UNITED STATES PATENT AND TRADEMARK OFFICE
CERTIFICATE OF CORRECTION

PATENT NO. : 8,011,052 B2
APPLICATION NO. : 11/613000
DATED : September 6, 2011
INVENTOR(S) : Eugene Kapustin and Sergei Filippovitch It is certified that error appears in the above-identified patent and that said Letters Patent is hereby corrected as shown below:

TITLE PAGE
Please insert item (30) Foreign Application Priority Data:

Should read
-- December 20, 2005 (CA) 2530932 --.

Signed and Sealed this
Sixth Day of March, 2012

David J. Kappos
*Director of the United States Patent and Trademark Office*